(No Model.)

J. A. SMITH.
SWEAT AND CHAFE PAD FASTENING.

No. 318,317. Patented May 19, 1885.

Witnesses:
Harriet A. Harris
Nathan W. Harris

Inventor.
John A. Smith
per Charles B. Read
Atty.

UNITED STATES PATENT OFFICE.

JOHN A. SMITH, OF TURNER, MAINE.

SWEAT AND CHAFE PAD FASTENING.

SPECIFICATION forming part of Letters Patent No. 318,317, dated May 19, 1885.

Application filed July 31, 1884. (No model.)

*To all whom it may concern:*

Be it known that I, JOHN A. SMITH, a citizen of the United States, residing at Turner, in the county of Androscoggin and State of Maine, have invented certain new and useful Improvements in Sweat and Chafe Pads for Harness; and I do hereby declare that the following is a full, clear, and exact description of the invention.

My invention relates especially to the method of attaching or fastening sweat and chafe pads to the saddle or any part of a harness where a pad may be used.

Heretofore pads have been fastened to harness-saddles by means of rigid and unyielding clasps.

The object of the present invention is to provide an elastic or yielding connection between the pad and the part of the harness to which it is to be attached, so that the pad may readily adjust itself to the various movements of the animal, and I accomplish this object by the means illustrated in the accompanying drawings.

Figure 1:
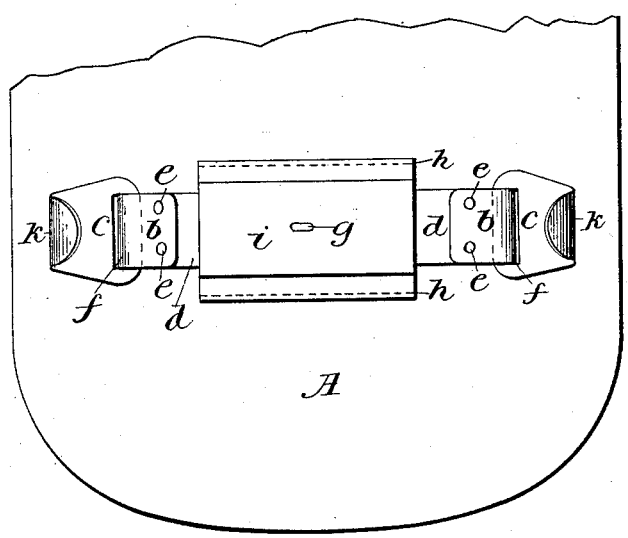
Figure 2:
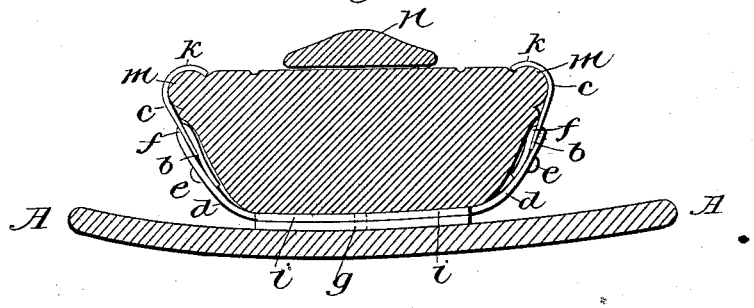

Figure 1 represents one end of a saddle-pad with the fastening device upon the upper surface as it appears when not attached to the saddle. Fig. 2 represents a section of saddle, fastening, and pad as it appears when the pad is fastened to the saddle.

As both ends of the pad are alike and fastened to the saddle in the same way it will be sufficient to describe but one.

Similar letters refer to similar parts in both views.

A A represent the pad. $d\ d$ is a rubber band passing through the leather sheath $i$, and is fastened to the sheath by the thread or rivet $g$, the sheath $i$ being fastened to the pad A A by the stitches $h\ h$.

To each end of the rubber band $d\ d$ is fastened a metallic clasp, $c\ c$, the fastening being effected by passing the end of the rubber band $d\ d$ through slot $f\ f$ of the clasp, the loop $b\ b$ being secured and held by rivets $e\ e$.

When the pad is in position and fastened to the saddle, as shown in Fig. 2, the rubber band $d\ d$ is slightly stretched and the folds or hooks $k\ k$ of the clasp $c\ c$ are hooked upon the roll $m\ m$ of the saddle, thus neatly and securely fastening the pad to the saddle.

What I claim as my invention, and desire to secure by Letters Patent, is—

The combination of the pad $a\ a$, the rubber band $d\ d$, the leather sheath $i$, and metallic or rubber clasps $c\ c$, as and for the purpose set forth.

JOHN A. SMITH.

Witnesses:
HARRIET A. HARRIS,
NATHAN W. HARRIS.